June 21, 1955 S. S. POKORNY 2,711,235
VEHICLE THROTTLE POSITION HOLDING DEVICE
Filed Sept. 14, 1951 2 Sheets-Sheet 2
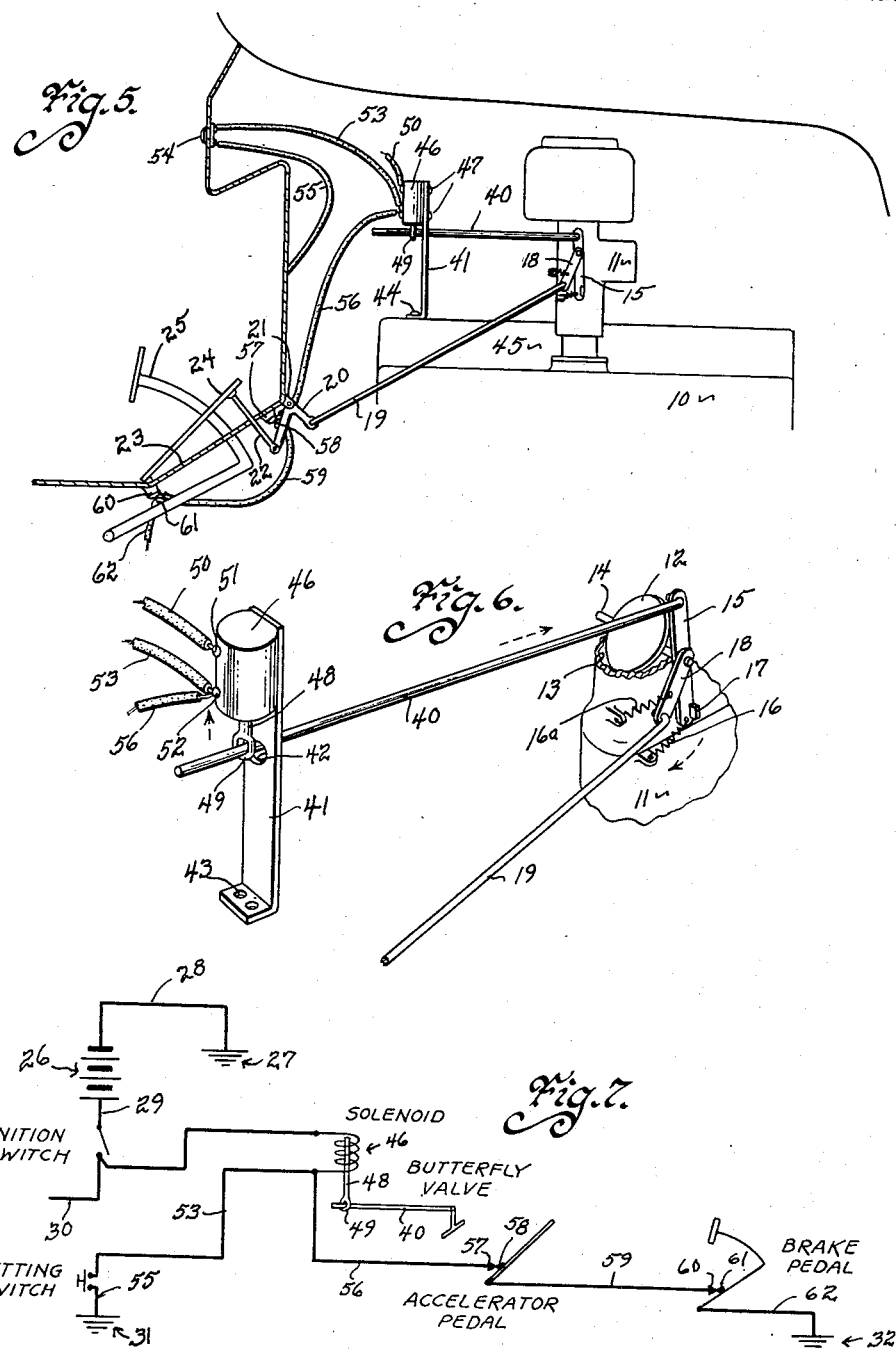
Inventor
Stephen S. Pokorny
by M. Talbert Dick
Attorney
Witness
Edward P. Seely

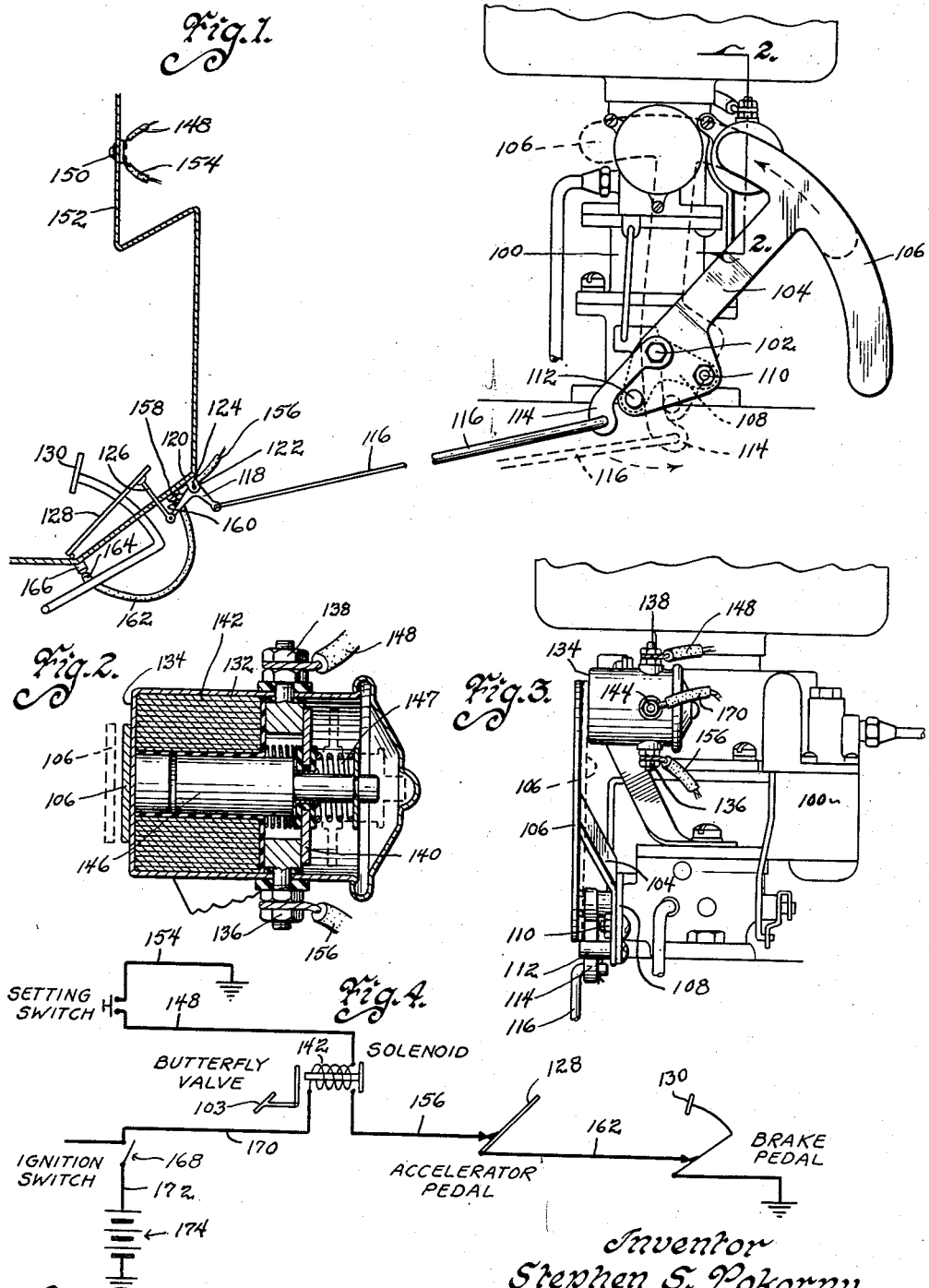

United States Patent Office 2,711,235
Patented June 21, 1955

2,711,235

VEHICLE THROTTLE POSITION HOLDING DEVICE

Stephen S. Pokorny, Maquoketa, Iowa

Application September 14, 1951, Serial No. 246,614

4 Claims. (Cl. 192—3)

My invention is a means for holding a throttle in any adjusted open position to relieve the driver of a vehicle from the need to constantly resist the spring tension that urges the throttle toward a closed or engine idling position. This device releases the throttle instantly, however, if action is instituted to either increase the speed of the engine or to brake the vehicle.

In the days when automotive vehicles were rare, the throttle was a hand controlled device that was frictionally retained in any set position. The throttle would be set to a desired position and would remain there until altered. As the automotive vehicle developed, however, the foot throttle became increasingly common. As the foot was ill-adapted to moving the throttle in two directions, it was spring loaded to idling position and any speed above idling was maintained by holding the throttle pedal depressed against the efforts of the spring. The manual throttle was retained for many years and is used even today by persons owning cars having manual throttle controls to hold the engine at a desired road speed on long trips. When one is traveling a long distance by automobile, the accelerator or throttle leg and foot become very fatigued particularly if a constant speed is maintained. As a result of this tendency toward fatigue, a hand throttle, if available, is sometimes used on long drives. Such use is hazardous, however, for the throttle remains on even if the driver attempts to stop the vehicle by applying the brake unless the driver is alert enough to turn the hand throttle off before applying the brake. Since the hand throttle is used very little, a driver seldom reacts rapidly to shut off the hand throttle; and this is particularly true when he is excited as would be true in the case of an emergency. A further hazard is added by the fact that the hand throttle is no longer mounted adjacent to the steering wheel as it used to be mounted, but is on the dash board or instrument panel. This location of the handle throttle adds to the hazard of using it. In recent years, therefore, the manufacturers of automotive vehicles have had a tendency to eliminate the manual throttle control altogether.

When there is no manual control, the driver must keep the foot throttle depressed to maintain speed. Unless one is accustomed to holding his foot in one position, he soon gets tired. The fatigue thus produced sometimes becomes so intense that the driver looses control over his muscles and his engine speed becomes erratic. Even before this stage of weariness is reached, however, the driver usually shifts his position around to relieve some of the fatigue he is feeling. In so doing, the driver usually alters his engine speed some. Some drivers are simply incapable of maintaining steady engine speeds and this is true whether they are tire or fresh. They simply lack the necessary muscle control. Of course, variations in engine speed are not fatal. Such variations do reduce the economy of operation of the engine. Conserving engine fuel is not a major item with many individuals, but it is important to our Nation and to the world. In these times of dwindling natural resources, when we are daily being warned of the drain on our natural wealth for defense purposes, every means for conserving any of our mineral reserves is valuable. Some individuals are interested in maintaining engine operation economy, too, of course. People such as truck owners and traveling people who do a lot of driving are anxious to maintain road speeds in order to get the most out of the money they spend for fuel. The professional truck driver is adept at maintaining road speed, of course, but even an experienced driver gets tired which makes it difficult for him to exercise his greatest skill at maintaining a steady or constant road speed.

In view of the foregoing, therefore, it is the principal object of my invention to provide a vehicle throttle position holding device that will hold the throttle control on the engine in any desired position.

It is a further object of my invention to provide a vehicle throttle position holding device that requires no particular skill or training to use.

It is a further object of my invention to provide a vehicle throttle position holding device that does not interfere with the normal operation of the vehicle.

It is a further object of my invention to provide a vehicle throttle position holding device that is safe to use in that it does not require the operator to learn any new habits to release the mechanism when the vehicle engine is speeded up or the vehicle braked.

It is a further object of my invention to provide a vehicle throttle position holding device that is not brought into operation accidentally.

It is a further object of my invention to provide a vehicle throttle position holding device that leaves the passenger compartment of the vehicle substantially free from mechanism.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a reduced schematic sectional view of a fragment of an automotive vehicle accelerator pedal, brake pedal and dash board shown in conjunction with a side view of a combustible mixture control device. Broken lines show the carburetor device in an adjusted position, Fig. 2 is a longitudinal sectional view of the combination switch and holding device taken on the line 2—2 of Fig. 1, Fig. 3 is a front view of my device mounted on a carbureting device.

Fig. 4 is a combination schematic mechanical and wiring diagram for my device,

Fig. 5 is a fragmentary schematic longitudinal sectional view of a vehicle with a modified form of my vehicle throttle position holding device mounted therein, Fig. 6 is an enlarged detail view of the solenoid controlled holding device and the carburetor of my modified structure. A portion of the latter is broken away to more fully illustrate the operation of the device, and Fig. 7 is a combination electrical wiring diagram and schematic mechanical diagram of the modified form of my device.

Referring to Figs. 1, 2, 3 and 4 of the drawings, I have used the numeral 100 to designate an ordinary Venturi type carburetor from which protrudes a shaft 102 that has the butterfly valve, numeral 103 in Fig. 4, rigidly secured to it. This is the conventional valve that controls the volume of combustible mixture that is admitted to the engine induction system. To this shaft I secure rigidly an elongated arm or rod 104 that carries a sector head 106 which must be of a magnetizable material. The arm 104 is merely bolted or otherwise secured to the conventional butterfly bell crank 108 by any suitable means such as bolt 110 and boss bolt 112. The boss bolt 112 also serves as a means for moving arm 104 by advancing the conventional throttle linkage lever arm 114 which is loosely secured on shaft 102. A conventional push-pull rod 116 extends from lever arm 114 to the pedal bell crank 118 which is pivotally secured to the floor boards 120 of the vehicle by a conventional bifurcated member 122 and pin 124. Short rod 126 secures the pedal 128 to pedal bell crank 118. The conventional brake pedal 130 completes the description of the conventional equipment shown and necessary to the operation of my device with the single exception of the conventional direct current power system which I have shown only in the wiring diagram. With the exception of arm 104 and its sector head 106, all the structure described has been usual and I now proceed to a description of the specific structure in addition to arm 104 and sector head 106 that constitutes my invention.

On the carburetor or at any suitable point adjacent to it, I mount a solenoid type switch, generally designated 132, with its bottom 134 positioned near to sector head 106, but normally having some clearance between them as shown in Fig. 3. The solenoid switch is of the standard type having insulated switch terminals 136 and 138 respectively, and an insulated contact element 140. One end of the solenoid coil 142 is connected to solenoid switch terminal 138 and the other end of the coil is secured to the insulated coil terminal 144. The numeral 146 designates the sliding core of the solenoid switch that carries contact element 140 down into the contact position shown in Fig. 2 from the spring loaded open positon shown in broken lines in that figure. The conventional return spring for the switch is designated 147. A lead line designated 148 extends from switch terminal 138 to the momentary contact setting switch 150 that is conveniently mounted on the instrument panel 152 or any other convenient place accessible to the vehicle operator. A second lead line 154 connects the switch to the frame work of the vehicle if the conventional "one wire" system is used, as it usually is. If a two wire system is used, however, lead 154 would connect to a source of electrical energy directly. The solenoid switch terminal 136 has a lead wire designated 156 extending from it to a contact point 158 secured near the accelerator bell crank 118 and insulated from the vehicle. A contact point designated 160 is mounted on bell crank 118 but insulated therefrom. These two contact points are a pair which make an electricity conducting connection when the accelerator pedal is in the "idle" or released position shown in Fig. 1. A conductor lead wire designated 162 extends from contact point 160 to a third contact point 164 that is mounted on brake pedal 130 and insulated from it. A fourth contact point 166 is mounted near the brake pedal point 164 and makes electrical contact therewith whenever the brake pedal is released or off. The point 166 is connected to the vehicle frame or to a source of electrical energy if the conventional "one wire" system is replaced with a two wire system. The coil terminal 144 is connected to the ignition switch 168 by lead wire 170. The ignition switch is connected by wire 172 to a source of electrical energy such as battery 174 shown in the wiring diagram, Fig. 4 only. The lead 176 is merely the lead from the ignition switch to the ignition system. The purpose of connecting the system through the ignition switch is merely a safety precaution to insure that the unit is turned "off" whenever the ignition is "off" and is a common practice with automotive vehicle accessories.

The operation of the system is very simple. During normal city driving, accelerator pedal 128 is depressed to produce a desired speed and push rod 116 advances lever arm 114. As lever 114 moves, it engages boss-bolt 112 which causes arm 104 to move toward the broken line position in Fig. 1. The bell crank 110 is similarly moved carrying shaft 102 with it and opening butterfly valve 103. When the pedal is released, a conventional return spring (not shown) returns the accelerator pedal 128 and its linkage to the idle position and arm 104 falls back to the solid line position in Fig. 1. A spring may be used to insure the return of arm 104 if desired, but I have found that sector head 106 will cause arm 104 to return to the idle position merely by the force of gravity. Thus, if my system is not energized, the vehicle is operated in the normal manner.

When operating the vehicle in open country, it is desired to use the throttle holding device; its operation is as follows. The vehicle is accelerated in the normal manner until the preferred speed is reached. At this time, setting switch 150 is depressed while holding the desired speed with the throttle control or accelerator pedal. As soon as the setting switch is depressed, a current carrying circuit is formed from battery 174 through lead 172, switch 168, lead 170, coil 142, lead 148, switch 150, lead 154, and the "ground" or frame of the vehicle back to battery 174. This path for current causes coil 142 to be energized which accuates the solenoid switch by drawing core 146 into the center of the magnetic field created by passing current through coil 142. The magnetic field of coil 142 also draws the sector head 106 over to the coil bottom and holds it there securely by magnetic force. While holding setting switch 150 against the spring tension that tends to force it open, the accelerator pedal is allowed to return to "idle" position. When released, the pedal and its linkage including push-pull rod 116 and lever arm 114 return to the solid line position of Fig. 1; but coil 142 holds sector head 106 and arm 104 in the broken line position shown in that figure. As the solenoid switch is also actuated by coil 142, contact element 140 connects switch terminals 136 and 138 together. The return of the accelerator pedal to idle closes the contact points 158 and 160 and completes a second circuit for coil 142. It is assumed that the brake is off. As soon as the accelerator pedal is released, therefore, the setting switch may be released and the second circuit holds the coil in an energized condition until the accelerator is depressed or the brake applied.

Whenever the brake or the accelerator pedal is depressed, one or the other of the contact points will be opened. The opening of either set of points causes the circuit for the coil 142 to be opened or broken. As soon as current ceases to flow in the coil 142, the return spring 147 opens the solenoid switch by sliding core 146 to the position shown in broken lines in Fig. 2. A release of the sector head 106 also occurs when coil 142 no longer exerts any magnetic force on it. Gravity will cause the sector head 106 to carry arm 104 and the butterfly back toward the solid line position as far as lever arm 114 and boss bolt 112 will permit. If the brake is applied, the engine will be reduced to idling, of course. If the accelerator is depressed, engine speed will correspond to the position assumed by the accelerator. While my throttle position holding device will hold the throttle in any set position when it is actuated, it will also be released instantly if either the brake or the accelerator is depressed. Also, the system will be deenergized if both the brake and the accelerator are depressed for any reason. Thus a driver using my system who encountered an emergency situation may respond in the normal manner to regain normal control over his vehicle. Also, of course, the coil 142 can be reenergized only by using setting switch 150. Thus coil 142 has current flowing through it only if the operator is using the system.

The system just explained is the preferred form of my device, but in the Figs. 5, 6 and 7 I have shown a modified form of my device, the structure and operation of which I will now explain.

In Figs. 5, 6 and 7 I have used the numeral 10 to designate the engine of a conventional internal combustion type using an ordinary carburetor 11. In the carburetor shown, the amount of fuel and air that reaches the cylinders is controlled by the position of the butterfly valve 12 which is pivotally mounted in the throat 13 of the carburetor 11 in the conventional manner. The shaft 14 is rigidly secured to valve 12 and pivotally supports it, and the lever 15 is rigidly secured to the shaft. A spring 16 yieldingly holds the lever 15 in a position that causes the butterfly valve to be in the closed or idling position. On lever 15 is a stop designated 17, the purpose for which will be explained immediately below. An arm 18 is secured to said shaft 14 as to be freely moving thereon. When arm 18 is moved it engages stop 17 to open butterfly valve 12 to increase the speed of the engine. A second spring 16a yieldingly holds the arm 18 in the position shown in Fig. 6. A rod 19 is pivotally secured to the end of the arm 14 and extends therefrom to one end of a bell crank 20 to which it is pivotally secured. The bell crank is pivotally supported by any suitable means such as the pivot support designated 21. The other end of the bell crank is secured to push rod 22 which in turn extends through the floor boards of the vehicle to the throttle pedal 24. 25 designates the brake pedal of the vehicle braking system. In the wiring diagram, the ignition switch is labeled. The wire from the battery 26 to the frame of the vehicle as represented by the "ground" symbol 27 is designated 28. The wire 29 connects the battery to the ignition switch, and numeral 30 designates the wire leading from the ignition switch to the ignition coil which is not material to this discussion and, therefore, is not shown. The ground for the setting switch is designated 31 and the one for the brake pedal contact points 32.

The numeral 40 designates a rod that is pivotally secured to lever 15. The rod 40 extends away from the carburetor a convenient distance to a bracket 41 and through an aperture or hold 42 therein. The bracket is secured as to be stationary with respect to the carburetor. Any suitable means may be used to do this and I have shown the bracket 41 provided with holes 43 through which cap screws 44 may extend to secure the bracket to cylinder head 45 as shown in Fig. 1. A solenoid coil 46 is secured to the bracket in a suitable manner as by cap screws 47. The solenoid is provided with a sliding core 48 that has a loop 49 formed at its extremity. The loop also embraces rod 40. When the solenoid is not energized, the loop 49 and hole 42 are aligned so that rod 40 is free to slide therein. An electrical conductor or wire 50 extends from the ignition switch, shown only on the diagram Fig. 3, to one terminal 51 of the solenoid. The other terminal 52 of the solenoid has two lines connected to it for reasons that will be explained fully under the heading of operation. One of these wires designated 53 extends from terminal 52 to a simple push button type of setting switch similar to the one used in the preferred form of my device. In the modified structure shown in Figs. 5 and 7 this switch is designated 54. The switch 54 is also connected to the frame work of the car or vehicle if the conventional "one wire" system is used. A short wire 55 is used for this purpose. The second wire 56 on terminal 52 of solenoid 46 extends to a contact point 57 mounted adjacent to the throttle linkage. This contact point could be located near the brake pedal also as in the preferred form. A second contact point 58 is secured to the accelerator pedal linkage member 20 as shown in Fig. 5. The point 58 is insulated from the throttle linkage and is connected by wire 59 to a third contact point designated 60 that is insulated from the "ground" of the "one wire" system and mounted near the brake pedal. A fourth contact point 61 that cooperates with point 59 is secured to the brake pedal 25 and is either grounded therethrough or provided with a separate grounding wire such as the one designated 62. The separate ground wire is considered to be preferable as it assures a more certain connection.

The operation of my modified device is substantially like the preferred form and requires the following steps. With the ignition switch on and the engine running, a desired engine and vehicle speed is established by depressing the accelerator or throttle pedal 24. In response to movement of the throttle pedal, the linkage moves arm 18 to engage the stop 17 on lever 15. As the butterfly valve is opened, the rod 40 is moved through hole 42 in bracket 41 and also through loop 49. When the desired speed is attained, push button switch 54 is turned on which supplies a complete circuit for the coil 46. Energizing the coil causes core 47 to move in the direction shown by the arrow near the solenoid in Fig. 6. This sliding movement of the core causes loop 49 to be drawn up and out of alignment with hole 42 placing a binding clamping force on rod 40 between the bottom of loop 49 and the top of hole 42 in bracket 41. The gas pedal or foot accelerator is then released and returns to its normal idling position. Because lever 18 is pivotally secured to shaft 14, the accelerator may so return to idling position without affecting the position of shaft 14 and the butterfly valve 12. Push button switch 54 is held down until the accelerator returns to idling. Once the accelerator is back to idling position, however, a new ground for the coil 46 is provided through the points 57, 58, 60 and 61, and their associated wires 56, 59 and 62. The switch 54 may then be released and solenoid 46 will remain energized to hold the butterfly valve in the selected position. The engine will be held at a constant speed, therefore, until action is taken to effect a change in speed. If for any reason the driver desires to increase the speed of the vehicle, he merely steps down on the accelerator pedal as he would normally. As soon as the pedal is depressed the slightest amount, points 57 and 58 are separated breaking the ground for the solenoid. As soon as the circuit is broken, core 47 slides down to realign the loop 49 and hole 42. As soon as the loop and hole are realigned, the rod 40 is free to move and the foot pedal and springs 16 and 16a take over control of the butterfly valve. The solenoid will not act again, of course, until it is reset with switch 54. A similar action occurs when the brake pedal is depressed except that points 60 and 61 are opened. Since the two sets of contacts are connected in series, opening either one will break the ground connection for the solenoid and return the carburetor system to its normal control. There is no possibility that the modified system can be engaged accidentally since, as is true also of the preferred form, a conscious effort must be made to actuate the switches in the proper sequence if the position holding solenoid is to be properly energized. Furthermore, a normal application of either the throttle or the foot brake will disengage the modified system also, thus there is no hazard involved in using my modified throttle position holder. Although the systems are not susceptible of accidental engagement, they are so easily turned on that no special skill is required for its use. Even the most unmechanically inclined persons can learn the sequence of steps necessary to engage the systems quickly and easily. When either of my throttle position holders is used, a constant speed is maintained without regard to the position of the driver's foot. The driver is free to shift his position, therefore, when my throttle position holder is used. The vehicle remains under perfect control, however, since the driver increases or decreases speed in the normal manner and as though my throttle position holder were not mounted on the vehicle. Thus, my throttle position holders achieve all the purposes set out above since the only portion of the mechanism that need be visible in the passenger compartment are the set switches 54 or 150 that may be placed in any easily accessible position.

The principal advantages of my preferred form over the modified device resides in the use of the solenoid switch and employing the magnetism of the coil to hold the elongated member that is secured to the throttle. By using the magnetic principal for holding the sector head, a much less complex structure to manufacture results. The advantage that flows from the use of the solenoid switch is that there is never any current flowing through the coil 142 except when the operator intends it. In the modified form, current will flow through the solenoid coil 46 whenever the brake and accelerator are in a released position. It would be possible for the throttle to be clamped in idling position, therefore, as when the car is idling at a stop light. Unless there is a little play in the throttle linkage to permit some movement of the accelerator pedal from the idle position before arm 18 contacts stops 17, the solenoid will continue to clamp the butterfly valve and resist movement of the accelerator pedal. This drawback is not found in the preferred form of the device, because the solenoid switch breaks the circuit and must be reenergized again with the setting switch before the brake accelerator line will be connected to the coil. Although I have shown my device in conjunction with the usual carburetor, it is obvious that it can be adapted to hold the throttle control of any system whether it uses fuel injection or whatever the system used.

Some changes may be made in the construction and arrangement of my vehicle throttle position holding device without departing from the real spirit and purpose of my invention, and it is my intention to cover by my claims, any modified forms of structure or use of mechanical equivalents which may be reasonably included within their scope.

I claim:

1. In a vehicle throttle position holding device for use with a vehicle having a shaft mounted throttle valve; said device comprising; a shaft adaped to be secured to a throttle valve, a lever fixed to said shaft, a lever rotatably mounted on said shaft adjacent to said lever fixed to said shaft, a stop fixed to one of said levers and projecting into the path of the other of said levers, an elongated member secured to said lever fixed to said shaft, an electro-magnet secured to said vehicle adjacent to said elongated member for immobilizing said elongated member when said electro-magnet is energized, a source of electrical energy, a means for connecting one end of the winding of said electro-magnet to said source of electrical energy, a means for connecting the other end of the winding of said electro-magnet to said source of electrical energy, an accelerator pedal, linkage connecting said rotatably mounted lever to said accelerator pedal, a switch operated by said accelerator pedal and forming a portion of one of said means for connecting said electro-magnet to said source of electrical energy; said switch being closed solely when said accelerator pedal is in the idling position and a momentary contact switch connected in parallel to said switch.

2. In a vehicle throttle position holding device for use with a vehicle having a shaft mounted throttle valve; said device comprising; a shaft adapted to be secured to a throttle valve, a lever fixed to said shaft, a lever rotatably mounted on said shaft adjacent to said lever fixed to said shaft, a stop fixed to one of said levers and projecting into the path of the other of said levers, an elongated member secured to said lever fixed to said shaft, an electro-magnet secured to said vehicle adjacent to said elongated member for immobilizing said elongated member when said electro-magnet is energized, a source of electrical energy, a means for connecting one end of the winding of said electro-magnet to said source of electrical energy, a means for connecting the other end of the winding of said electro-magnet to said source of electrical energy, an accelerator pedal, linkage connecting said rotatably mounted lever to said accelerator pedal, a direct action switch operating exclusively by movement of said accelerator; said switch forming a portion of one of said means for connecting said electro-magnet to said source of electrical energy.

3. In a vehicle throttle position holding device for use with a vehicle having a shaft mounted throttle valve; said device comprising; a shaft adapted to be secured to a throttle valve, a lever fixed to said shaft, a lever rotatably mounted on said shaft adjacent to said lever fixed to said shaft, a stop fixed to one of said levers and projecting into the path of the other of said levers, an elongated member secured to said lever fixed to said shaft, an electro-magnet secured to said vehicle adjacent to said elongated member for immobilizing said elongated member when said electro-magnet is energized, a source of electrical energy, a means for connecting one end of the winding of said electro-magnet to said source of electrical energy, a means for connecting the other end of the winding of said electro-magnet to said source of electrical energy, an accelerator pedal, linkage connecting said rotatably mounted lever to said accelerator pedal, a switch operated by said accelerator pedal and forming a portion of one of said means for connecting said electro-magnet to said source of electrical energy; said switch being closed solely when said accelerator pedal is in the idling position, a momentary contact switch connected in parallel to said switch, and an electro-magnetically operated switch associated with said electro-magnet and connected in parallel to said momentary contact switch and in series with said switch.

4. In a vehicle throttle position holding device for use with a vehicle having a shaft mounted throttle valve and a brake pedal, said device comprising; a shaft adapted to be secured to a throttle valve, a lever fixed to said shaft, a lever rotatably mounted on said shaft adjacent to said lever fixed to said shaft, a stop fixed to one of said levers and projecting into the path of the other of said levers, an elongated member secured to said lever fixed to said shaft, an electro-magnet secured to said vehicle adjacent to said elongated member for immobilizing said elongated member when said electro-magnet is energized, a source of electrical energy, a means for connecting one end of the winding of said electro-magnet to said source of electrical energy, a means for connecting the other end of the winding of said electro-magnet to said source of electrical energy, an accelerator pedal, linkage connecting said rotatably mounted lever to said accelerator pedal, a switch associated with said brake pedal and operated thereby; said switch being a portion of one of said means for connecting said electro-magnet to said source of electrical energy; said switch being open when said brake pedal is moved to reduce speed of said vehicle and closing when said brake pedal is released.

References Cited in the file of this patent

UNITED STATES PATENTS

| Number | Name | Date |
|---|---|---|
| 2,159,772 | Schroedter | May 23, 1939 |
| 2,270,002 | Glick | Jan. 13, 1942 |
| 2,478,884 | Wiseley | Aug. 9, 1949 |
| 2,487,606 | Smith | Nov. 8, 1949 |
| 2,509,358 | Krieg | May 30, 1950 |
| 2,554,619 | Goik | May 29, 1951 |
| 2,621,766 | Patrick | Dec. 16, 1952 |